Patented Oct. 11, 1938

2,133,203

UNITED STATES PATENT OFFICE 2,133,203

METHOD OF PROMOTING THE GROWTH AND ACTIVITY OF MICROORGANISMS

Paul Liebesny and Hugo Wertheim, Vienna, Austria

No Drawing. Application July 11, 1935, Serial No. 30,934. In Austria July 12, 1934

10 Claims. (Cl. 195—46)

This invention relates to methods of promoting the growth and activity of microorganisms. It has already been proposed, inter alia for the purpose of promoting the growth and activity of microorganisms, to irradiate the matter to be treated with waves of wave lengths between 120 metres and 1.8 millimetres. According to these prior proposals, the wave length used and the other conditions of the irradiation are selected or determined so as to suit the nature of the matter treated. This forms a continuation-in-part of the copending application Serial No. 663,642, filed March 30, 1933, now Patent No. 2,107,830, issued Feb. 8, 1938.

The method of the present invention consists in irradiating the microorganism to be treated and causing the irradiated organism to develop in a single culture transplanted by inoculation or in a plurality of successive cultures transplanted by inoculation from the preceding at each stage. If for example in a fermentation plant there be required a large quantity of ferments for sowing, the original culture is irradiated, and then developed to the requisite quantity by multiplication in a plurality of successive cultures, without repetition of the irradiation. This method of working is an important advance in the art since it is in practice difficult to irradiate large quantities of seed ferment. The apportioning of the irradiation (as to wave length, current intensity, duration, and other factors) is so determined that the desired effect is manifested in that culture of the entire series in which the quantity required for sowing purposes is attained.

We have found that irradiations which are even of unfavorable effect to begin with, are capable subsequently of exerting favorable action. The method according to the invention can also be carried out in such a manner that the microorganism is irradiated not only in one culture but in two or more cultures. With this method of treatment, the improved properties acquired through the irradiation are transmitted to the succeeding cultures, and are improved to a still higher degree on further irradiation. Either successive cultures may be irradiated, or individual cultures in the series may be left unirradiated.

For the carrying out of the irradiation according to the present invention there are preferably employed the oscillations set up by a high frequency oscillation generator. All the arrangements of connections at present known in the art can be employed for this purpose. The ascertainment of the conditions of irradiation best suited in any particular instance is effected experimentally. It is necessary in each individual case to ascertain by tests, in how many cultures the once irradiated microorganism must be propagated, or how many cultures must be irradiated, how often, how long, and under otherwise what conditions irradiation of the individual cultures must be effected, to obtain the optimal results.

Investigations have recently been carried out into the effect of electric short waves, ultra short waves, and extremely short waves on human and animal organs afflicted with infectious diseases (Haase und Schliephake, "Strahlentherapie" (Ray Therapeutics), 1931, p. 133; Liebesny, "Wiener Klinische Wochenschrift" (Viennese Clinical Weekly), 1931, p. 653 and p. 1422; Liebesny and Finaly, "Wiener Klinische Wochenschrift", 1932, p. 249). For the purpose of the present specification the term "short waves" is to be understood as including waves of wave-lengths between 120 metres and 6 metres, the term "ultra short waves" as including waves of wave-lengths between 6 metres and 2 metres, and the term "extremely short waves" as including waves of wave-lengths between 2 metres and 1.8 millimetres.

The influencing, in accordance with the invention of micro and other living organisms, of enzymes, ferments, and the like organic and physiologically active substances is therefore effected by the employment of electric short waves, ultra short waves, extremely short waves and waves in the vicinity of the said orders of wave length.

Under certain circumstances it proves advisable to employ different conditions of irradiation in one or the other culture in the series of cultures. At the same time we have also ascertained that the employment of varying conditions of irradiation in one and the same culture yields favorable effects. The conditions are changed for example in such cases in one and the same culture, since unfavorable effects are produced under certain conditions when the irradiations is carried out solely or at first under these conditions, while favorable results can be obtained by carrying out the treatment first under other conditions and only subsequently under the first-mentioned set of conditions.

Examples (1) *Saccharomyces cerevisiae* sown on beer wort agar in a sloping test-tube is irradiated in the condenser field of a short wave emitter with a 15 metre wave, at an intensity of 150 milliamperes, at a resonance of 7.2, and at a temperature below 30° C. (with cooling), three times in the course of 24 hours for 1 minute each time (culture $B_1$), for 5 minutes each time (culture $C_1$), and for 10 minutes each time (culture $D_1$). A comparative culture (culture $A_1$) was left unirradiated. After the lapse of 24 hours, all the cultures were more or less strongly developed. Portions of all four cultures are then transplanted by inoculation onto fresh nutrient substratum of the same nature in each case (new cultures $A_2$, $B_2$, $C_2$, and $D_2$). Culture $A_2$ is left unirradiated. Cultures $B_2$, $C_2$, and $D_2$ are irradiated, and that again three times in the course of 24 hours, $B_2$ for 1 minute each time, $C_2$ for 5 minutes each time, and $D_2$ for 10 minutes each time. In all the cases of renewed irradiation, the second culture develops more rapidly and vigorously than the corresponding once irradiated starting culture and the non-irradiated culture $A_2$. Of the three irradiated second stage cultures, culture $C_2$ proves to be the most powerfully developed. Microscopic examination shows that the largest number of most powerfully developed cells are present in culture $C_2$.

(2) *Clostridium butyricum* sown on a liquid starch-containing mash in a test-tube is irradiated twice in the course of 24 hours in the condenser field of a short wave emitter, with a 4 metre wave, at an intensity of 75 milliamperes, at a resonance of 4.8, and at a temperature below 30° C. (with cooling), for 5 minutes, 10 minutes, and 20 minutes each time (cultures $B_1$, $C_1$, and $D_1$, respectively). The comparative culture $A_1$ remains unirradiated. In every instance of irradiation development is more rapid than in the case of the non-irradiated culture. But at the same time, the number of types of spores in the irradiated cultures is low as compared with the non-irradiated culture. All the cultures are then inoculated onto fresh nutrient substrata of the same nature. The inoculated samples $B_2$, $C_2$, $D_2$ of the irradiated cultures are irradiated (again twice in the course of 24 hours for 5, 10, and 20 minutes each time, respectively), while the inoculated sample $A_2$ of the non-irradiated culture is left unirradiated at this stage. This procedure of transplantation by inoculation, and irradiation, is repeated twice more, so that in all inoculations onto fresh substrata are effected three times, and in addition to the starting cultures three successive cultures are irradiated. After the second and third irradiation ($B_2$, $C_2$, $D_2$, and $B_3$, $C_3$, $D_3$) the results are not noticeably different from those after the first irradiation, but a difference is observable after the fourth irradiation. After the fourth irradiation, the whole of the differently irradiated cultures ($B_4$, $C_4$, $D_4$) show clearly different types as compared with the corresponding starting cultures. The tendency to sporulation is reduced in each case. The remaining morphological properties appear very noticeably altered in each case. The alterations are most noticeable in the case of culture $C_4$ (10 minutes irradiation). In culture $C_4$ hardly any types of spores are still detectable. After carrying out of the main fermentation with starch-containing mash, culture $C_4$ gives a yield which is some 3½% higher, as regards products of fermentation, than the non-irradiated culture $A_1$, or the non-irradiated inoculations $A_2$ to $A_4$ derived therefrom.

(3) Yeast of the race *Saccharomyces cerevisiae* is irradiated three times for twenty minutes each time in the course of 24 hours in the condenser field of a short wave emitter, with a five meter wave, at an intensity of 150 milliamperes, at a resonance of 7.2, and at a temperature of 28° C. (under cooling). The irradiated culture is transplanted by inoculation to fresh substrata five times. The second, third, and fourth cultures are left unirradiated, while the fifth culture is irradiated with a 12 metre wave and otherwise under the same conditions as those given above. The sixth culture is again left unirradiated. A comparative culture is maintained unirradiated throughout six successive stages of transplantation by inoculation. Determination of yield shows that in the sixth culture in the series proceeding from the treated starting culture the yield in approximately 12% higher than in the case of the sixth culture in the series proceeding from the non-treated starting culture.

(4) *Clostridium butyricum* sown on a liquid starch-containing mash in a test-tube is irradiated in the condenser field of a short wave emitter, at an intensity of 150 milliamperes, and at a temperature of 28° C. under cooling conditions, three times daily in the course of 24 hours, first with a 12 metre wave for 5 minutes each time and following immediately thereon with a 4 metre wave for 10 minutes each time. The irradiated culture is inoculated from one nutrient substratum to the next for five times in succession. The comparative cultures are left unirradiated. Determination of yield shows that in the sixth culture in the series proceeding from the treated starting culture the yield of fermentation products is about 4% higher than in the case of the sixth culture in the series proceeding from the non-treated starting culture.

We claim:

1. A method of promoting the growth and activity of micro-organisms, which consists in irradiating the micro-organism to be influenced on a nutritive foundation in a condenser field from 4 meters to 15 m. wave length in several periods, causing the thus irradiated material to develop in a series of 3 to 8 cultures obtained by consecutive inoculation on to fresh substrates, irradiating at least one culture selected from the said series likewise in a condenser field ranging from 4 meters to 15 m. wave length, and cooling during said irradiations to such an extent that the optimal cultivation temperature is not exceeded.

2. A method as claimed in claim 1, characterized by the fact that the starting culture and the last two cultures of the consecutive cultures are irradiated.

3. A method as claimed in claim 1, characterized by the fact that the starting culture and the penultimate culture of the consecutive cultures are irradiated.

4. A method as claimed in claim 1, characterized by the fact that the starting culture and the last culture of the consecutive cultures are irradiated.

5. A method of manufacturing yeast, which consists in irradiating the yeast on a nutritive foundation in a condenser field ranging from 4 meters to about 12 meters wave length in several periods, causing the irradiated material to develop in a series of as many cultures as are requisite under the practical conditions of the yeast manufacture, the said cultures being obtained by consecutive inoculation on to fresh substrates, and irradiating the last two cultures of the said series in a condenser field ranging from about 12 to 15 m. wave length, while maintaining the irradiated cultures at a temperature of 28° C.

6. A method as claimed in claim 5, in which the cycle comprising irradiation and inoculation is repeated at least twice before proceeding to the said inoculation without irradiation.

7. A method of increasing the yield of fermentation products in the manufacturing of butyl alcohol and acetone, which consists in irradiating cultures of acetone-butyl alcoholic fermentation organisms of the type of *clostridium butyricum* and the like, on a nutritive foundation in a condenser field ranging from 56 cm. to 15 m. wave length in several periods, and causing the irradiated material to develop in a series of 2 to 6 cultures obtained by consecutive inoculation on to fresh substrates, while apart from the first culture at least two cultures selected from the said series of consecutively inoculated cultures are irradiated in the same way as the first culture, while maintaining the irradiated cultures at a temperature below 30° C.

8. A method as claimed in claim 7, in which the cycle comprising irradiation and inoculation is repeated at least twice after which inoculation is continued without further irradiation.

9. A method as claimed in claim 1, characterized by the fact at least one of the individual cultures is irradiated consecutively with waves of different wave lengths selected from the range from 4 meters to 15 meters.

10. A method as claimed in claim 5, characterized by the fact that the starting yeast and the last culture of the consecutive cultures are irradiated.

PAUL LIEBESNY.
HUGO WERTHEIM.